US009425986B2

(12) United States Patent
Gargett

(10) Patent No.: US 9,425,986 B2
(45) Date of Patent: *Aug. 23, 2016

(54) SYSTEM AND METHOD FOR MULTIPLE CONCURRENT VIRTUAL NETWORKS

(71) Applicant: iWebGate Technology Limited, Perth (AU)

(72) Inventor: Charles Dunelm Gargett, Lathlain (AU)

(73) Assignee: iWebGate Technology Limited, Perth (AU)

( * ) Notice: Subject to any disclaimer, the term of this patent is extended or adjusted under 35 U.S.C. 154(b) by 245 days.

This patent is subject to a terminal disclaimer.

(21) Appl. No.: 14/139,594

(22) Filed: Dec. 23, 2013

(65) Prior Publication Data

US 2014/0112347 A1 Apr. 24, 2014

Related U.S. Application Data

(63) Continuation-in-part of application No. 13/039,027, filed on Mar. 2, 2011, now Pat. No. 8,615,014.

(60) Provisional application No. 61/309,875, filed on Mar. 3, 2010.

(51) Int. Cl.
*H04L 12/46* (2006.01)
*H04L 12/721* (2013.01)

(52) U.S. Cl.
CPC ....... *H04L 12/4641* (2013.01); *H04L 12/4612* (2013.01); *H04L 12/4633* (2013.01); *H04L 12/4658* (2013.01); *H04L 45/66* (2013.01)

(58) Field of Classification Search
CPC .................................................. H04L 12/4612
USPC ................. 370/395.5–395.54, 400, 409, 410
See application file for complete search history.

(56) References Cited

U.S. PATENT DOCUMENTS

| 7,010,716 B2* | 3/2006 | Yu ....................... G06F 11/2005 |
| | | 709/239 |
| 7,242,665 B2* | 7/2007 | Langille .............. H04L 12/4641 |
| | | 370/217 |

(Continued)

OTHER PUBLICATIONS

International Search Report of corresponding International Application No. PCT/AU2011/000247 dated May 5, 2011, total 2 pages.

(Continued)

*Primary Examiner* — Andrew Lai
*Assistant Examiner* — Andrew C Lee
(74) *Attorney, Agent, or Firm* — Knobbe, Martens, Olson & Bear, LLP

(57) ABSTRACT

Techniques are provided for establishment of multiple concurrent virtual networks. In one example, there is provided a method operable by a message management unit (MMU) or the like. The method may involve establishing communication handles with a plurality of virtual network interfaces (VNIs) operatively coupled to an operating system, and establishing a network communications socket (NCS) operatively connected to a plurality of virtual layered networks. The method may involve establishing data channels that couple the MMU and its components with the respective VNIs of the MMU, and allowing the virtual layered networks to be concurrently transported on top of physical network(s). The method may involve facilitating communication between the operating system and the virtual layered networks via the combination of the established data channels, the established handles and a network software stack of the operating system.

20 Claims, 10 Drawing Sheets

(56) References Cited

U.S. PATENT DOCUMENTS

| | | | |
|---|---|---|---|
| 7,260,648 B2* | 8/2007 | Tingley | H04L 29/12009 709/227 |
| 7,389,358 B1* | 6/2008 | Matthews | H04L 12/2876 709/226 |
| 7,463,584 B2* | 12/2008 | Allan | H04L 12/4679 370/234 |
| 7,715,381 B2* | 5/2010 | Shen | H04L 12/4679 370/254 |
| 8,073,966 B2 | 12/2011 | Hannel et al. | |
| 8,166,474 B1 | 4/2012 | Delco et al. | |
| 2002/0067725 A1* | 6/2002 | Oguchi | H04L 12/4641 370/390 |
| 2003/0204618 A1 | 10/2003 | Foster et al. | |
| 2004/0095940 A1 | 5/2004 | Yuan et al. | |
| 2004/0120322 A1* | 6/2004 | Wu | H04L 12/5602 370/395.4 |
| 2006/0209836 A1 | 9/2006 | Ke et al. | |
| 2007/0050525 A1 | 3/2007 | Pao et al. | |
| 2007/0198656 A1 | 8/2007 | Mazzaferri et al. | |
| 2008/0107126 A1 | 5/2008 | Oguchi | |
| 2008/0259934 A1 | 10/2008 | Matthews et al. | |
| 2009/0129385 A1* | 5/2009 | Wray | H04L 12/4633 370/392 |
| 2009/0300605 A1 | 12/2009 | Edwards et al. | |
| 2010/0054260 A1 | 3/2010 | Pandey et al. | |
| 2010/0107162 A1 | 4/2010 | Edwards et al. | |
| 2010/0131669 A1 | 5/2010 | Srinivas et al. | |
| 2010/0290473 A1 | 11/2010 | Enduri et al. | |
| 2011/0243032 A1 | 10/2011 | Jenne et al. | |

OTHER PUBLICATIONS

Deri L. et al., "N2N: A Layer Two Peer-to-Peer VPN," retrieved from the Internet: <URL http://luca.ntop.org/n2n.pdf>, published on Feb. 5, 2009 as per Wayback Engine, Section 3-5, Fig 1&2.

Sourceforge.Net, "Universal TUN/TAP driver—FAQ," Retrieved from the Internet: <URL http://vtun.sourceforge.net/tun/faq.html> published on Jan. 10, 2009 as per Wayback Engine, Whole document.

* cited by examiner

SYSTEM AND METHOD FOR MULTIPLE CONCURRENT VIRTUAL NETWORKS

CROSS-REFERENCE TO RELATED APPLICATIONS

This application is a continuation-in-part of U.S. patent application Ser. No. 13/039,027, entitled "System and Method for Multiple Concurrent Virtual Networks", filed Mar. 2, 2011, now U.S. Pat. No. 8,615,014, which claims the benefit of U.S. Provisional Application No. 61/309,875, entitled "System of Multiple Concurrent Virtual Networks," filed Mar. 3, 2010, each of which is hereby expressly incorporated by reference herein.

BACKGROUND OF THE INVENTION

1. Field of the Invention

The present application relates generally to communication networks, and more particularly to a computer-implemented technique for converging connectivity for multiple virtual layered networks.

2. Description of the Related Art

The use of multiple physical network connections using multiple physical network interfaces as peripherals in a single computer is well known in the art. An advantage of such a system is that a computer user can be concurrently and distinctly connected to multiple separate and discreet networks. This is particularly valuable in handling very large networks or in situations where high security is needed for each individual network but a computer user has clearance for access to more than one network at the same time. A requirement for this technique, replicable for each network connection and therefore restricting the number of connections that can be made, is the need for a specific hardware interface within a given node with an associated connection medium, for example an Ethernet cable, coupling the network interface to a specific network or network segment. To alleviate the restriction to the number of physical connections possible, the use of the 802.1q VLAN protocol, also known in the art, provides for the establishment of restricted broadcast domains on any given local area network that can redefine and restrict the boundaries of a logical network segment to ensure that targeted machines are able to communicate to the possible exclusion of all others. However this technique may be inefficient over wider area networks and may be considered insecure if transmissions are made over public networks without the assistance of secured tunnel, bridge or trunk connections between distinct VLANs which may be provided by additional, complex hardware and/or software modules.

The advantage of a virtual network connection is that it has made it possible for private networks to "piggy back" on or "tunnel" through other, often public networks and for the communications to be facilitated completely in software, thereby reducing costs and enabling rapid upgrade of network capability and deployment. The virtual network is accomplished by simulating with software the capabilities and functions normally delivered by physical network devices, however such virtual networks may restrict the corresponding capabilities of a physical local area network by preventing broadcasting over the virtual network connection thereby reducing the features provided by a broadcast domain.

Such virtual networks currently supply one point-to-point virtual network circuit at a time in any given client as an extension to exactly one physical network or as a bridge network between exactly two physical networks. In this context, it would be desirable to deliver the capabilities of a system concurrently connected to multiple distinct networks but doing so virtually as a software process.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for facilitating the establishment of multiple concurrent virtual networks. The method may be performed by a message management unit (MMU) or the like. In one embodiment, the method may involve establishing communication handles with a plurality of virtual network interfaces (VNIs) operatively coupled to an operating system. The method may involve establishing a network communications socket (NCS) operatively connected to a plurality of virtual layered networks, and establishing data channels that operatively couple the MMU and its components with the respective VNIs of the MMU. The method may involve allowing the virtual layered networks to be concurrently transported on top of one or more physical networks. The method may involve facilitating communication between the operating system and the virtual layered networks via the combination of the established data channels, the established handles and a network software stack of the operating system. In related aspects, the method may involve using any supporting layer 4 network protocols (e.g., transmission control protocol (TCP), user datagram protocol (UDP), or the like) for establishing a single network communications socket in the MMU operatively coupled to a plurality of virtual layered networks. The method may involve facilitating communication between a node and, for example, an operating system or firmware and the virtual layered networks via a single layer 4 NCS.

In accordance with one or more embodiments and corresponding disclosure thereof, there is provided a system of multiple concurrent virtual networks wherein the system may include a plurality of virtual layered networks operatively coupled to an NCS. The system may include an MMU further incorporating a message payload encapsulation module (MPEM), wherein the MMU may be capable of establishing handles to a single NCS and to one or more VNIs to facilitate communications via external data channels coupled to the logical outside of the handles, and those handles in turn may be operatively coupled to respective internal data channels to the MPEM, wherein the internal data channels are coupled to the logical inside of the handles. This system may consequently provide conduits for messages to be transferred from the NCS to the one ore more VNI, via the MMU incorporating the MPEM wherein data processing may occur within the MMU and the MPEM. The system may include the VNIs, MMU, MPEM, communications handles, data channels and single NCS in a single computer software process but may also provide additional data processing modules and units that are not covered in this disclosure, for example and not limited to, an encryption management module for security and/or a compression management module for network traffic acceleration. These additional data processing modules and units, while mandatory for the performance and security of the embodiments described hereinafter, are not crucial to the successful function of the system and method of multiple concurrent virtual networks and are therefore not directly covered in this disclosure but may be implemented within the single software process adjacent to the MMU or within the MMU adjacent to the MPEM and would be coupled to such components in such a way to facilitate appropriate data processing of the messages and/or message payloads traversing the system.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION OF PREFERRED EMBODIMENTS

Figure 1:
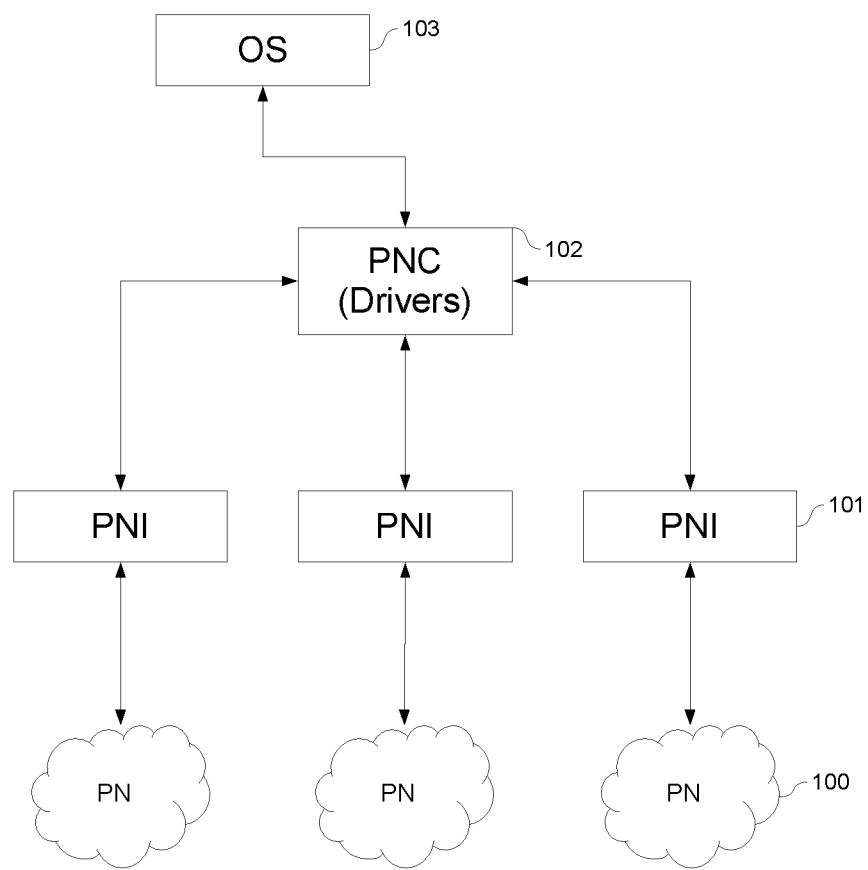
FIG. 1 shows a physical network connection system (prior art).

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments. The word "exemplary" is used herein to mean "serving as an example, instance or illustration". Any embodiment described herein as "exemplary" is not necessarily to be construed as preferred or advantageous over other embodiments. The techniques described herein may be used for various communication networks, wired or wireless.

In accordance with one or more aspects of the embodiments described herein, there is provided features of a technique for converging connectivity for multiple virtual layered networks (e.g., by using encapsulation or tagging within a single computer software process using a single communications socket and at least one virtual network interface (VNI).

The terms "network" and "system" are often used interchangeably. The term "operating system" and "embedded system" may be used interchangeably herein and are considered to be one and the same. When referred to herein, an "operating system" is considered to be a collection of software and/or firmware that manages computer hardware resources and provides common services for supported software applications and the like.

A VNI refers to a software device often residing in the kernel of the operating system or embedded system that allows user-space software to be attached in order to read and/or write data packages to and/or from a network software stack at a pre-defined layer within the stack, e.g., layer 2, layer 3 or layer 4 (or possibly higher). Throughout this disclosure, when referring to operating with or on a VNI, data packages are deemed to be read/written at any one of these layers.

The terms "network communications port", "network communications socket", "network port" and "network socket" are used interchangeably, mean one and the same and refer to or the use of a network communications socket established via a capable layer 4 network protocol in the operating system network stack software.

The term "message" refers to a single package of data, including virtual layered network information tags, received from or written to a network communications socket. The terms "message payload", "packet payload" and "payload" are used interchangeably, mean one and the same and refer to a single package of data, not including virtual layered network information tags, received from or written to a virtual network data stream at a predefined OSI model layer, for example but not limited to the VNI from which Ethernet frames or IP packets may be read/written.

In reference to messages, the term "tag" refers to the stream of bytes attached to the logical front of a message payload. In reference to messages, the term "tagged" refers to a message payload that has had a stream of bytes attached to it that are used to identify the virtual network to which the payload belongs. In reference to messages, the term "tagging" refers to the process of attaching a stream of bytes to a message payload for the purpose of identifying the message in respect to the virtual network to which it shall belong. Message tags may also include other data or information relating to the virtual network it belongs to.

The terms "converge" and "converging" may be used herein to mean the process of bringing together or combining multiple message streams for transmission on a single network communications socket. The terms "diverge" and "diverging" may be used herein to mean the process of separating messages received on a single network communications socket for writing individually to one or more data streams, for example but not limited to, VNI handles.

With reference to FIG. 1, there is shown an overview of a physical network connection system on a single computer, known in the art. Each physical computer network (PN) 100 is connected to a physical communications or network interface (PNI) 101 that is in turn connected to a physical network controller (PNC) 102 that in turn delivers the communication data to an operating system (OS) 103 for processing and use by computer applications. The example in FIG. 1 also shows a multiple instance physical network connection that is known in the art. This configuration allows the computer user and applications to communicate and interact across multiple physical networks simultaneously.

Figure 2:
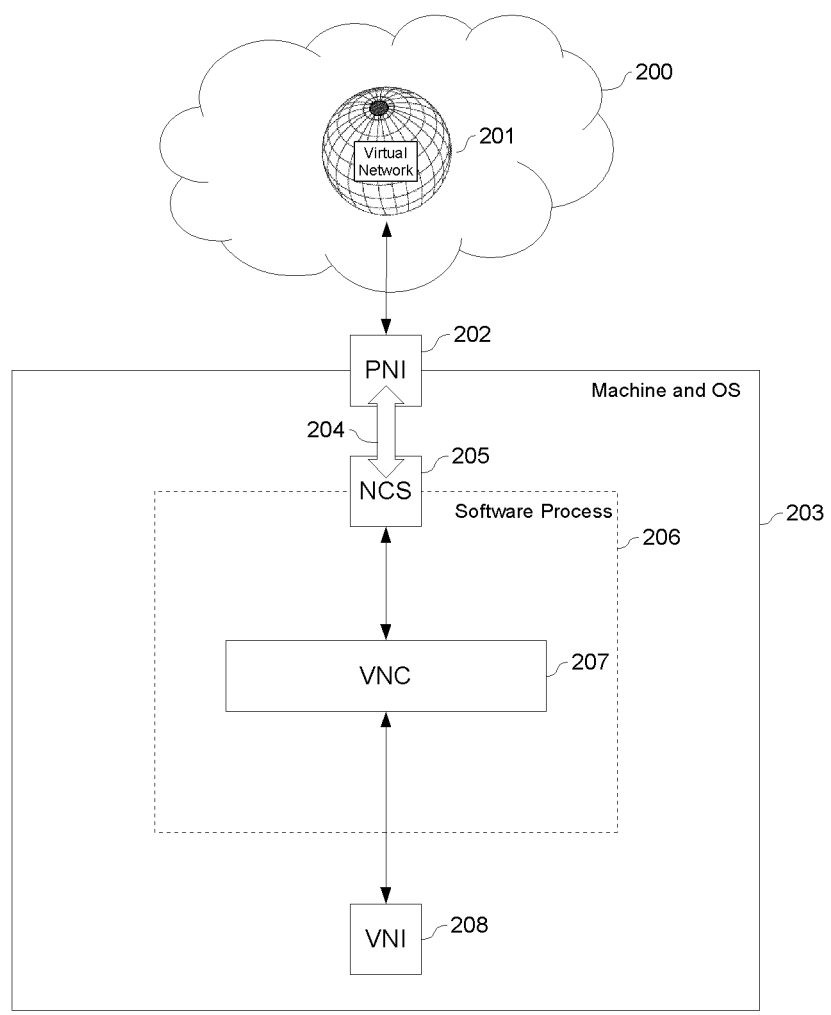
FIG. 2 shows a single instance virtual communications network (prior art).

With reference to FIG. 2, there is shown an example of a single instance virtual network, known in the art. A single virtual network (VN) 201, residing in or across one or more physical networks 200, is connected by a single network communications socket (NCS) 205 coupled to a computer's physical network interface (PNI) 202 and a network software stack 204 of the computer's operating system 203. The data packages originating from a VN arrive at the NCS handled by a single software process 206 comprising a virtual network controller (VNC) component 207 which reads an incoming VN data package from the NCS 205, processes it and writes the resulting payload to the VNI 208. The reverse of this procedure is also true. Additionally, it should be obvious and understood by those skilled in the art that the system demonstrated in FIG. 2 could be replicated within the same system multiple times although separate software processes or kernel instances would be required to uphold each network connection through distinct network communication sockets handled by the operating system. This would facilitate a cumbersome and resource hungry means of virtually replicating the system outlined in FIG. 1.

Figure 3:
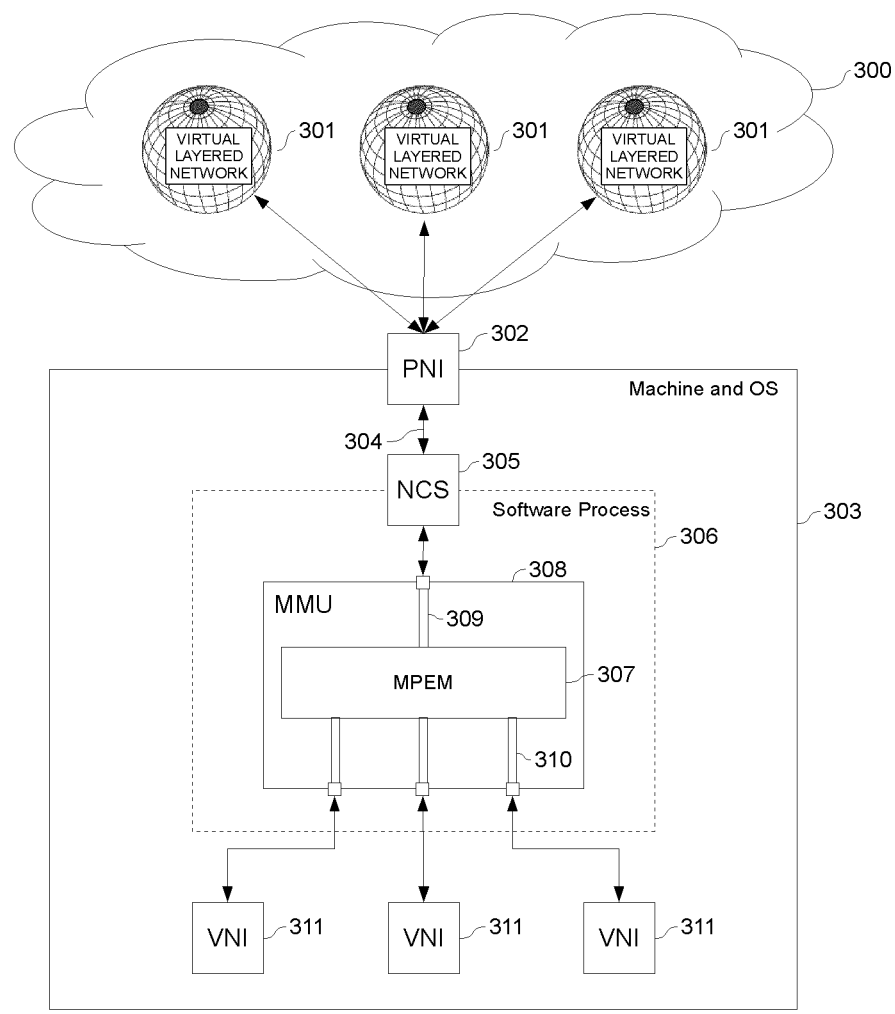
FIG. 3 shows an embodiment of a system of multiple concurrent virtual networks in a single computer software process depicting a one-to-one VNI-to-virtual layered network relationship.

With reference to FIG. 3 there is provided an example embodiment of a system of multiple concurrent virtual networks. Similar to the system described in FIG. 2, a virtual layered network 301A-B, established in or across one or more physical networks 300, is logically coupled to a single NCS 305 via a computer's PNI 302 and a network software stack 304 of the computer's operating system 303. However, and to provide differentiation from the system described in FIG. 2, the single NCS 305 is capable of receiving messages from the multiple virtual layered networks 301A-B so that the computer running the single process is able to be simultaneously connected to the multiple virtual layered networks 301A-B. The multiple virtual layered networks 301A-B, residing in or across one or more physical networks 300, are connected by the NCS 305 via the computer's PNI 302 and the network software stack 304 of the computer's operating system 303. The messages originating from the virtual layered networks 301A-B arrive at the NCS 305 handled by the single process 306 comprising a message management unit (MMU) 308. The MMU 308 further comprises a message payload encapsulation module (MPEM) 307, an NCS data channel 309 and its respective NCS handle. Messages are received from the NCS 305 via the data channel 309 within the MMU 308 and transferred to the MPEM 307, wherein the messages are processed by utilizing tag removal and scrutiny to determine which of the plurality of VNI data channels 310A-B the resulting message payload may be written for transmission beyond the MMU 308 to the corresponding VNI from among VNIs 311A-B. The reverse of this procedure is also true.

The embodiment of FIG. 3 shows the inclusion of three simultaneous and separate network connections. However, in other embodiments, the system may support one or more connections. In related aspects, in another embodiment, the system may include a virtual routing module within the MMU, or a virtual routing unit between the MMU and the operating system, to allow groups of virtual networks to connect to other groups of virtual networks.

Figure 4:
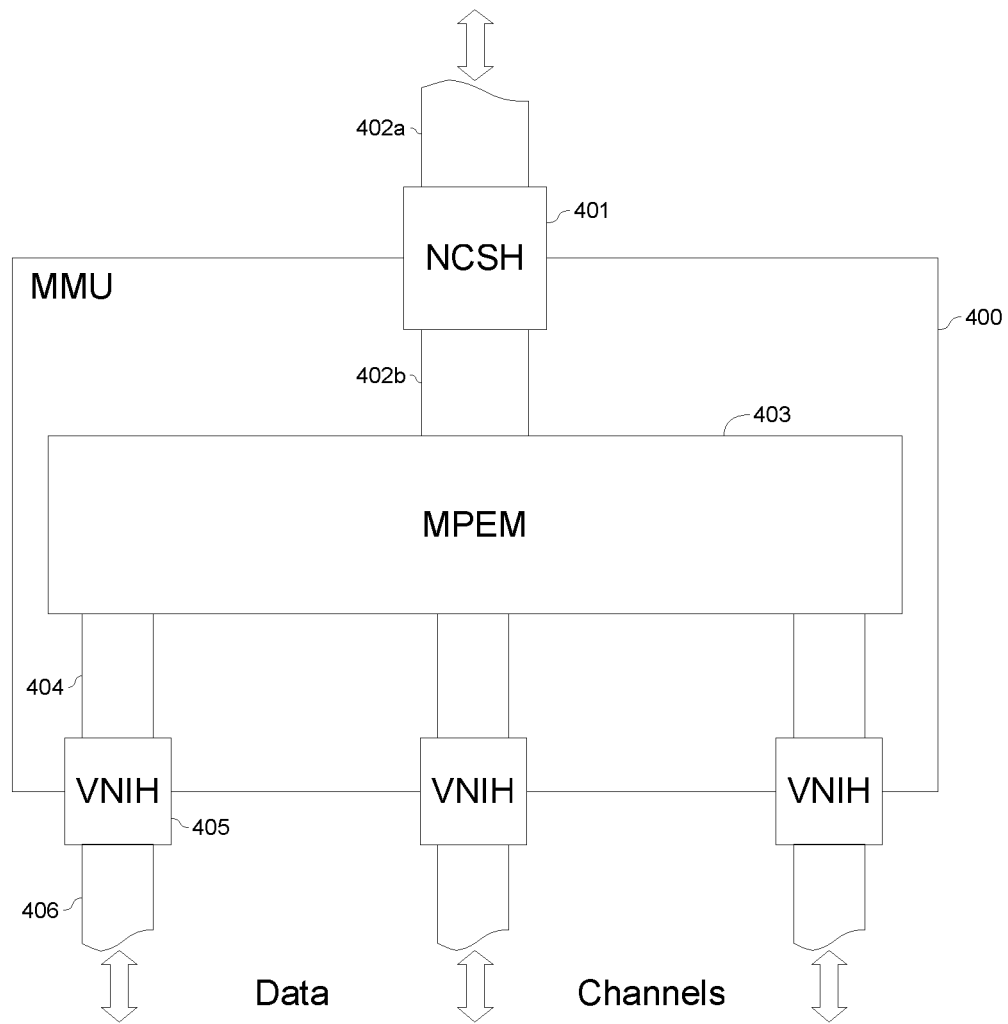
FIG. 4 illustrates an example methodology and processes for establishing multiple concurrent virtual networks using a message management unit (MMU) and incorporated components where a one-to-one VNI-to-virtual layered network relationship is employed.

With reference to FIG. 4, there is provided an example embodiment of a message management unit (MMU) component 400 being a data processor within a single computer process as a possible embodiment of the system of multiple concurrent virtual networks. Traffic through this component may be bidirectional, flowing in one direction or the other and each is described individually herein.

With continued reference to FIG. 4, message payloads arriving at one of a plurality of VNI handles (VNIH) 405A-B via a corresponding data channel 406A-B between the VNIH and a VNI (not shown in FIG. 4) are made available for reading and transferred to a message payload encapsulation module (MPEM) 403 via an internal data channel 404. Each payload may be read and transferred either sequentially from one VNIH or simultaneously from multiple VNIHs to the MPEM 403. The payload is then tagged by the MPEM 403 making it clear which virtual network the message is intended for before being passed back to the MMU 400 along an internal data channel 402b and subsequently written to a single network communication socket handle (NCSH) 401 via an external data channel 402a along with a plurality of additional messages originating from the same or additional VNIHs within the MMU 400.

With continued reference to FIG. 4, messages from a plurality of virtual layered networks (not shown in FIG. 4) may arrive via a PNI (not shown in FIG. 4) where they are transferred to the MMU 400 via an external data channel 402a and become available for reading on a single network communications socket handle (NCSH) 401 within the MMU 400 and subsequently transferred via an internal data channel 402b to the MPEM 403. A message may be provided as part of a sequential stream of messages to the data processor within the MPEM for inspection wherein the tag is removed from the message and scrutinized to facilitate the identification of the message by the MMU 400 in relation to the VNIH 405 to which the resulting payload should be written wherein the VNIH will transmit the payload through a corresponding data channel 406 to the corresponding VNI (not shown in FIG. 4).

It is noted, with reference to FIG. 3 and FIG. 4, that the disclosed embodiments outlined thus far demonstrate a plurality of one-to-one relationships between the virtual layered networks 301A-B and the respective VNI 311A-B wherein the message management unit (MMU) 308 and 400 and the embedded message payload encapsulation module (MPEM) 307 and 403 are able to easily maintain a correlation between the two components when message streams are converged or diverged within the MMU. While functional, the limitation of this embodiment relates to the number of VNIs a given operating system is able to handle concurrently thereby restricting the number of virtual layered networks a node may be connected to simultaneously.

In another example, there is not necessarily one-to-one relationships between the virtual layered networks and the VNIs. To demonstrate a resolution to this restriction, additional embodiments are now described with continued reference to the drawings wherein similar outcomes can be obtained through possible message and/or message payload header interrogation and/or manipulation providing a one-to-many relationship between a single VNI and a plurality of virtual layered networks.

Figure 5:
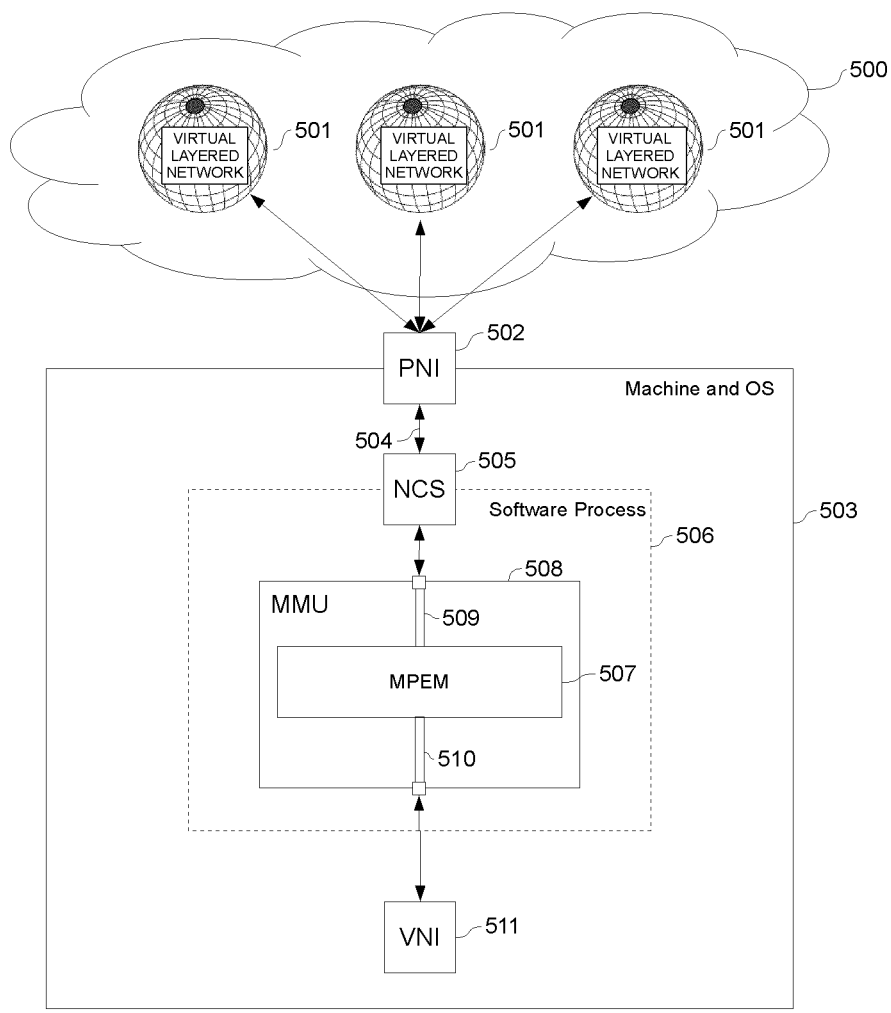
FIG. 5 illustrates an embodiment of a system of multiple concurrent virtual networks in a single computer software process depicting a one-to-many VNI-to-virtual layered network relationship.

With reference to FIG. 5, there is provided an example embodiment of a system of multiple concurrent virtual networks wherein a one-to-many relationship between a single VNI 510 and a plurality of virtual layered networks is demonstrated. Similar to the system described in FIG. 2, but with reference to FIG. 5, a virtual layered network 501, wherein the network 500 comprises networks 501A-B that are established across one or more physical networks 500. The network 501 may connect to a single network communications socket (NCS) 505 via a computer's physical network interface (PNI) 502 and a network software stack 504 of the computer's operating system 503. However, the single NCS is capable of receiving messages from multiple virtual layered networks so that the computer running the single process is able to be simultaneously connected to multiple virtual layered networks. The multiple virtual layered networks 501A-B, residing in or across one or more physical networks 500, are logically connected to the network communications socket (NCS) 505 via the computer's physical network interface (PNI) 502 and the network software stack 504 of the computer's operating system 503. The messages originating from the virtual layered networks 501 arrive at the NCS handled by the single process 506 comprising a message management unit (MMU) 508 further comprising a message payload encapsulation module (MPEM) 507, an NCS data channel 509 and its respective NCS handle. Messages are received from the NCS via the data channel 509 within the MMU and transferred to the MPEM wherein the messages are processed to remove the tag with the resulting tag information and payload provided back to the MMU, separately, for validation before the payload is written to the single VNI data channel and ultimately to the VNI. The reverse of this procedure is also true.

In related aspects, additional functionality of the MMU 508 and its integrated components, including but not limited to the MPEM, is provided herein to clarify the implementation of routines to facilitate the one-to-many relationship between the VNI and the plurality of virtual layered networks. For outbound messages, the MMU 508 uses the header information within the message payload, including but not limited to the Ethernet frame header, to determine the intended destination of the payload which is then used by the MPEM to tag the payload with appropriate headers, including delivery information, before writing the resulting message to the NCS 505 and where the underlying operating system or embedded system will deliver the message to the intended location.

In further related aspects, the MMU and its integrated components, including but not limited to the MPEM, is responsible for reading one or more incoming messages from the NCS that arrive from one ore more of the virtual layered networks via the underlying operating system. The message is provided to the MPEM where the message tag is removed and provided back to the MMU, along with the message payload, in order for the MMU to validate the message and determine the destination. In this embodiment, there is only one destination for the resulting payload and, once passing the message scrutiny routines of the MMU, the payload is written to the VNIH where it is taken up by the operating system for final processing.

It is necessary to understand that in order for the messages being sent and received by the MMU to be accepted by the respective operating system, the system must remain governed by the requirements of the native network protocols, including but not limited to the Internet Protocol, and their respective headers. One example is provided herein relating to the Internet Protocol and it should be understood by skilled artisans that this method is equally applicable to other suitable network protocols that are able to operate over a suitable traditional network.

With continued reference to FIG. 5, in order to facilitate a one-to-many relationship between a VNI 511 and a plurality of distinct virtual layered networks 501A-B, an appropriate Internet Protocol address mask must be applied to ensure that incoming messages from the plurality of virtual layered networks is acceptable. For example, while the remote nodes connected to individual virtual layered networks may be configured with distinct C class sub-network masks ensuring that no two virtual layered network address ranges overlap or clash, the Internet Protocol address assigned to the VNI is masked with an A class sub-network mask wherein the plurality of C class assigned virtual layered networks would all fall within the range of the network octet of the A class address range. For example, a skilled artisan implementing such a one-to-many embodiment might assign smaller C class sub networks to remote node in the virtual layered network while the A class network address 10.0.0.0 might be assigned to the local VNI instance to ensure that the local operating system knows to send related messages to the VNI wherein message payload scrutiny and/or header manipulation would assist with proper tagging of the payload and ensure correct delivery to the intended remote node in the respective virtual layered network.

Figure 6:
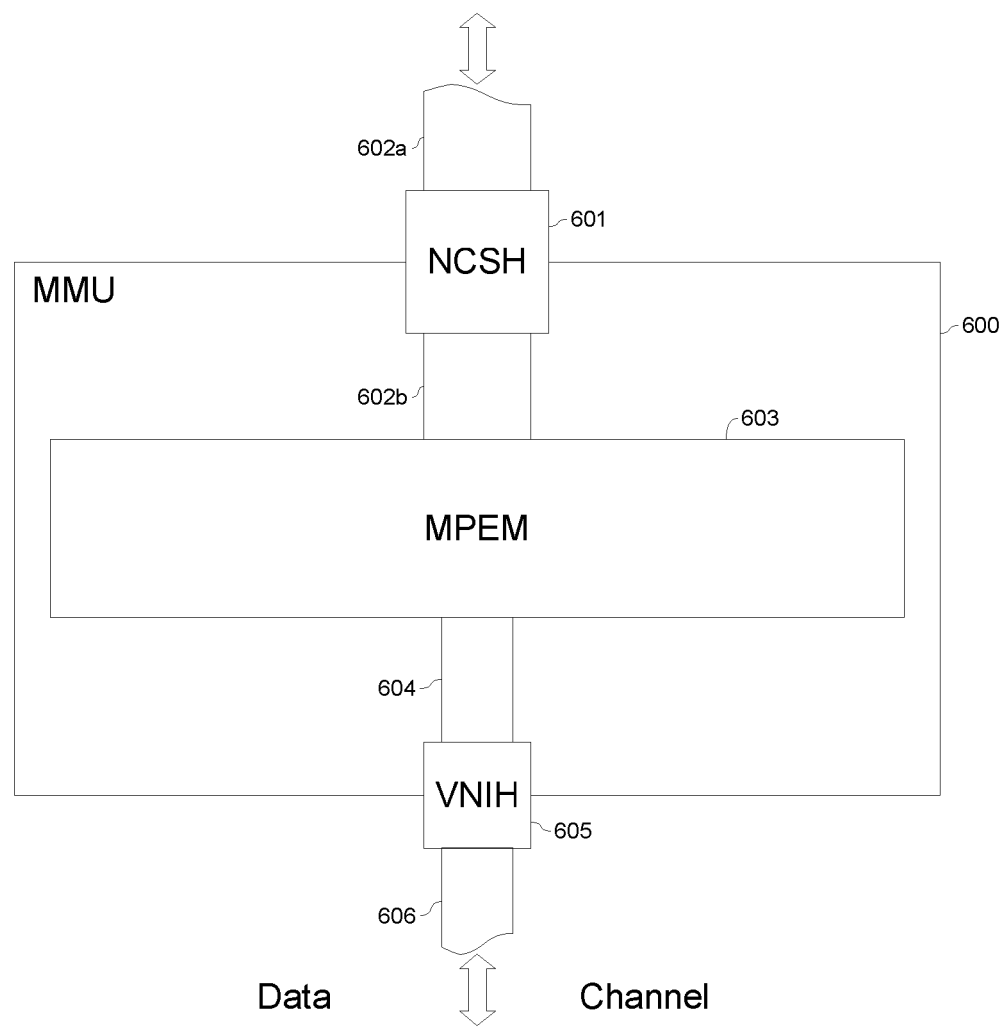
FIG. 6 illustrates an example methodology and processes for establishing multiple concurrent virtual networks using a message management unit and incorporated components where a one-to-many VNI-to-virtual layered network relationship is employed.

With reference to FIG. 6, there is provided an example embodiment of a simplified message management unit (MMU) component 600 being a data processor within a single computer process as a possible embodiment of the system of multiple concurrent virtual networks. Traffic through this component is bidirectional, flowing in one direction or the other and each is described individually herein.

With continued reference to FIG. 6 and in comparison to FIG. 4, the process implemented by the message management unit (MMU) component 600 is much the same as that of the same component demonstrated in FIG. 4, however is somewhat simplified in that it has no need to handle multiple VNIs in order to couple the node to multiple concurrent layered virtual networks. Message payloads arrive on the single VNI Handle (VNIH) 605 via a corresponding data channel 606 between the VNIH and the VNI (not shown in FIG. 6) and are made available for reading and transferred to the message payload encapsulation module (MPEM) 603 via an internal data channel 604. In order to determine the destination virtual layered network to which the payload is intended, the MPEM inspects the payload header information and tags the payload before returning the resulting message to the MMU which inspects the tag information of the message to find the target node and, if known, the MMU will deliver the message via the internal data channel 602b and the network communications socket handle (NCSH) 601 to the target node in the respective virtual layered network via external data channel 602a. If the target node for the data packet is not known, then deeper inspection of the payload may be executed and if the target node is still unable to be determined, the payload may be treated as a broadcast data packet requiring transmission on all virtual layered networks in order to locate the target node or, alternatively, may be deemed by the MMU as undeliverable and subsequently dropped.

With continued reference to FIG. 6, one or more incoming messages from a plurality of virtual layered networks (not shown in FIG. 6) may arrive via a physical network interface (PNI) (not shown in FIG. 6) and become available via an external data channel 602*a* for reading on a single network communications socket handle (NCSH) 601 within the MMU 600. The message is transferred to the MPEM 603 via an internal data channel 602*b* and made available for processing. All messages may be provided sequentially to the data processor within the MPEM for inspection wherein the tag is removed and from the message facilitating the separation of the tag from the message payload. The resulting tag information and message payload is then returned to the MMU for tag inspection and writing of the payload to the single VNIH, to which all virtual layered networks are indirectly coupled, wherein the VNIH will transmit the resulting payload to the VNI (not shown) via the appropriate data channel 606. There is no need for the MMU 600 to determine a specific VNIH to write the payload to as there is only ever one VNIH and subsequently only one VNI to which payloads are delivered.

In view of exemplary systems shown and described hereinafter, the disclosed subject matter may include or utilize a layered encryption zone (LENZ) which can be considered to define a specific, encrypted communication domain between two or more network entities or nodes via a virtual layered network. In order to be bound to a LENZ, a node must maintain knowledge of the virtual layered network name and an encryption key that is used to encrypt and decrypt outgoing and incoming message payloads respectively. It is the combination of the network name and the encrypted communications that defines the logical boundaries of the communication domain between nodes. Any node that does not have knowledge of the virtual layered network name and the encryption key is considered to be outside of the LENZ and is not capable of communication on the virtual layered network.

In another embodiment of a system of multiple concurrent virtual networks and the facility of the one-to-many relationship, a common Internet Protocol address range and sub-network mask can be applied to all nodes participating in the virtual layered network. As used herein, a wildcard node may refer to a node that is connected to multiple networks and is designated to read and handle packets from all networks while only being bound to a single VNI. Non-wildcard nodes require a 1-to-1 VNI-VN relationship. A wildcard node therefore could be connected directly to many different virtual networks with one network interface. In view of FIG. 5 and its related description, and with additional reference to FIG. 7 there is provided an exemplary system demonstrating the achievement of a one-to-many relationship between wildcard Node A 701 and three isolated and independent Nodes B 702, C 703, and D 704 wherein wildcard Node A 701 is assigned a single, B class sub-network IPv4 address and is also bound to 3 distinct layered encryption zones (LENZ) named VLAN1/KEY1, VLAN2/KEY2 and VLAN3/KEY3 which correspond to the individual and isolated nodes 702, 703 and 704. Messages from either Node B 702, C 703 or D 704 arriving on the single network communications socket (NCS) of the wildcard Node A 701 are decrypted using the encryption key that is selected based on information contained in the tags of the messages that arrive. Once these tags are removed and the separated message payload is decrypted, the resulting payload is written to the single VNI for processing by the operating system. The reverse of this procedure is also true.

Figure 7:
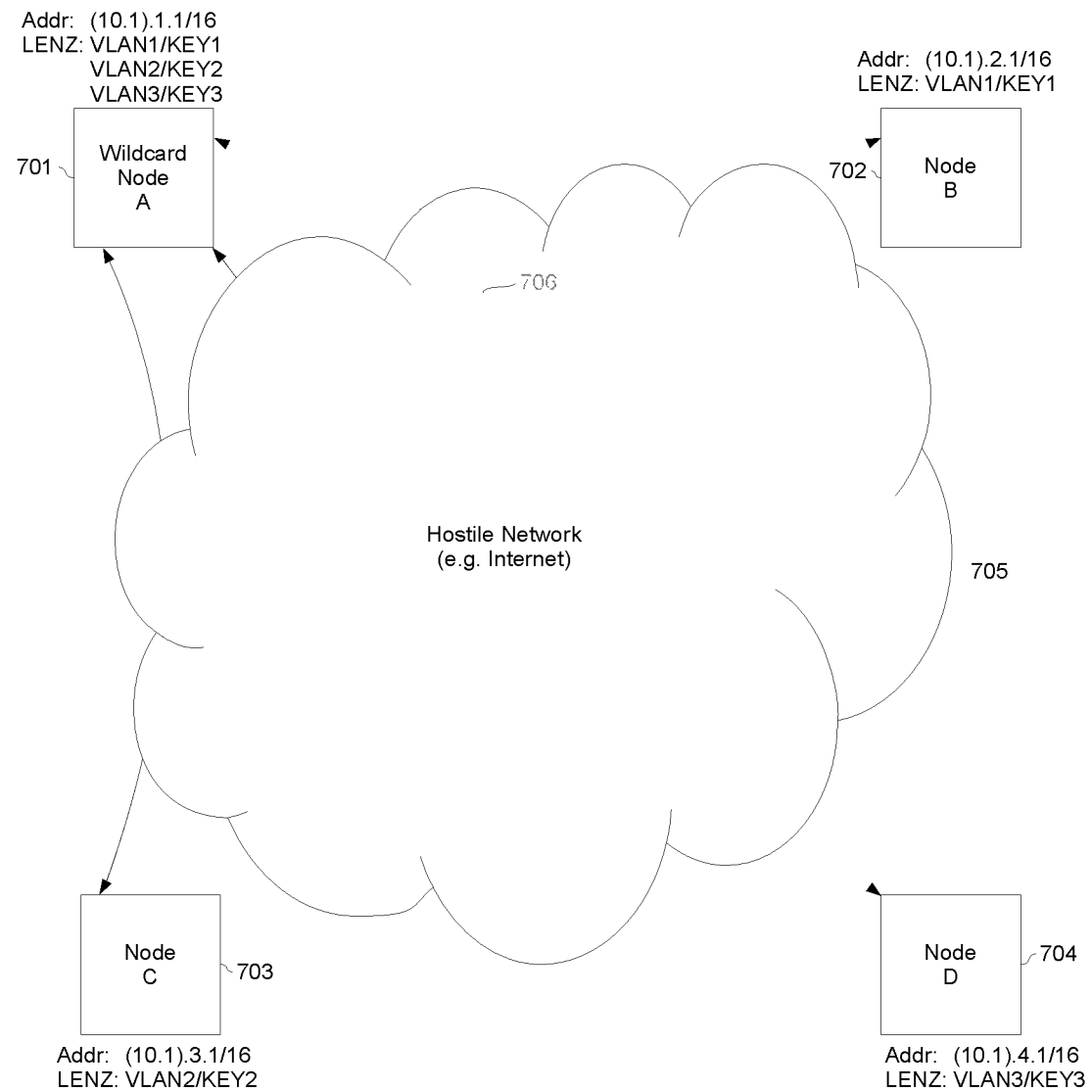
FIG. 7 demonstrates an example methodology where a one-to-many VNI-to-virtual layered network may be implemented and denotes the boundary of a given layered encryption zone (LENZ).

As a specific, but not limiting, demonstration of how this is achieved, reference to FIG. 7 is continued with particular interest paid to the wildcard Node A 701 and Node D 704. The two nodes communicate via the layered encryption zone (LENZ) VLAN3/KEY3 706 which in turn uses the hostile network 705 (e.g. the Internet) as its physical transport medium over which the LENZ is layered, and where wildcard Node A 701 is assigned a virtual layered network IPv4 address of 10.1.1.1/16 and Node D 704 is assigned a virtual layered network IPv4 address of 10.1.4.1/16. These IPv4 address assignments stipulate that based on the common network segment of the addresses determined by the 16 bit network IPv4 address mask, traditional IPv4 packet delivery will be honored allowing the two nodes to locate each other and readily communicate assuming matching elements of the LENZ, for example a common virtual layered network name and matching encryption key. Nodes B 702 and C 703, while on the same IP subnet, are configured with different LENZ binding information and therefore are unable to communicate on the VLAN3/KEY3 LENZ communications domain.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
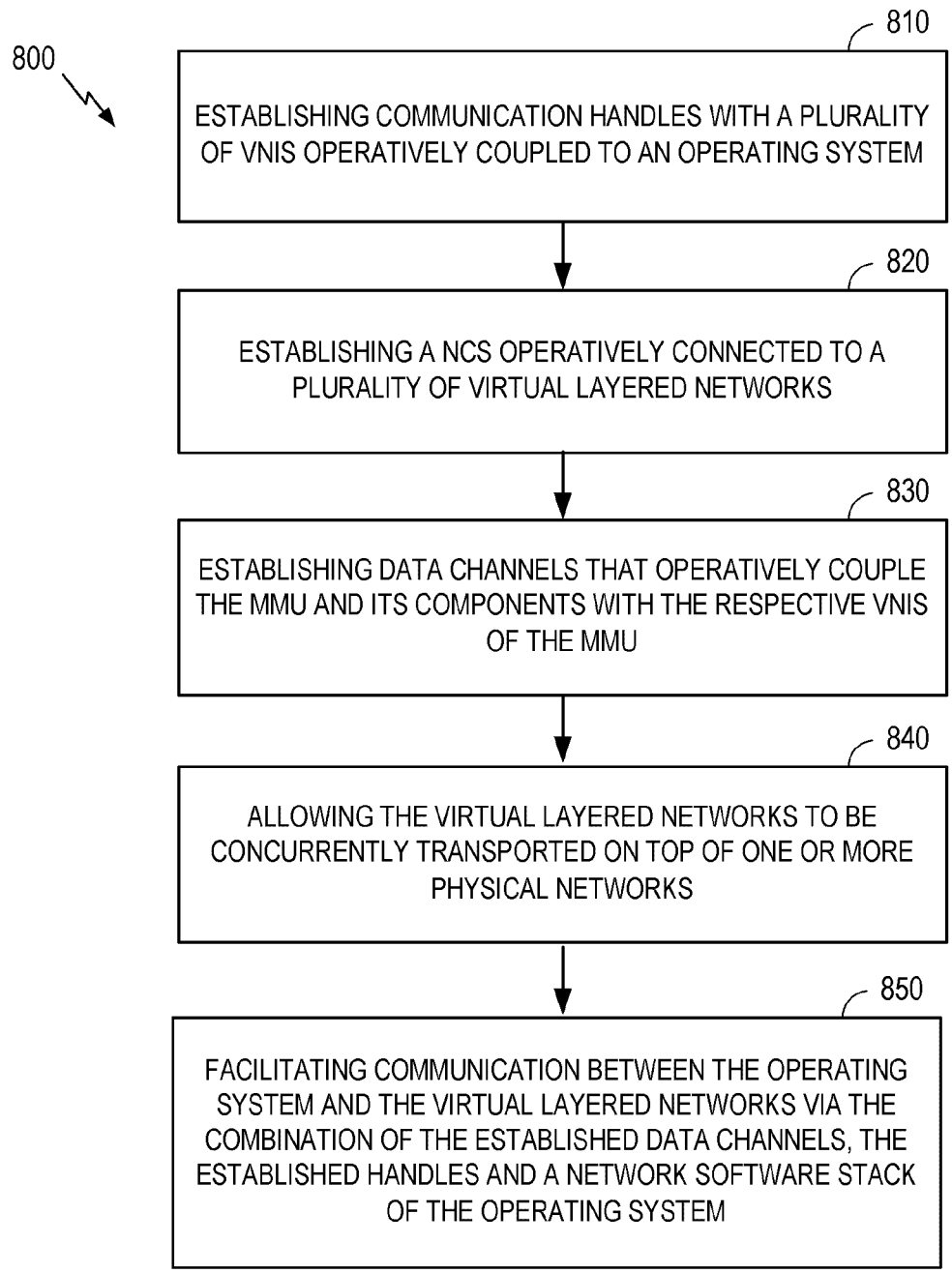
FIG. 8 illustrates further aspects of the methodology of FIGS. 4 and 6.

In accordance with one or more aspects of the subject of this disclosure, there are provided methods for establishing and using multiple concurrent virtual networks. With reference to FIG. 8, illustrated is a methodology 800 that may be performed by a MMU or the like. The method 800 may involve, at 810, establishing communication handles with a plurality of VNIs operatively coupled to an operating system. The method 800 may involve, at 820, establishing a NCS operatively connected to a plurality of virtual layered networks. The method 800 may involve, at 830, establishing data channels that operatively couple the MMU and its components with the respective VNIs of the MMU. The method 800 may involve, at 840, allowing the virtual layered networks to be concurrently transported on top of one or more physical networks. The method 800 may involve, at 850, facilitating communication between the operating system and the virtual layered networks via the combination of the established data channels, the established handles and a network software stack of the operating system.

Figure 9:
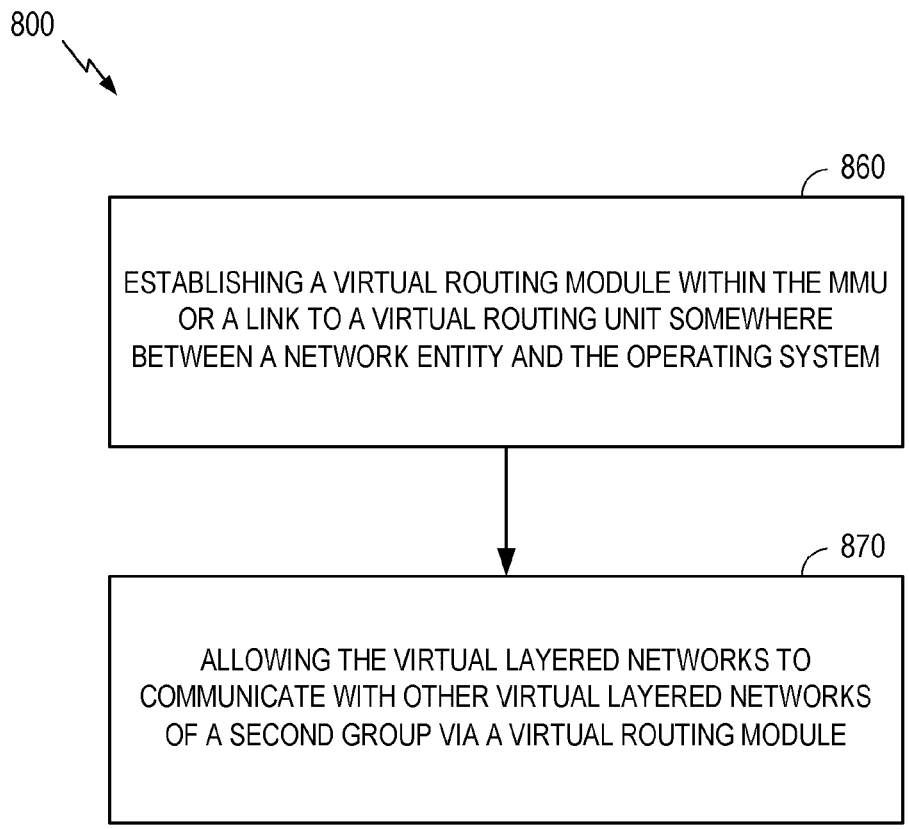
FIG. 9 illustrates further aspects of the methodologies of FIGS. 4 and 6 relating to transfer of messages between virtual layered networks.

With reference to FIG. 9, there are shown further operations or aspects of method 800 that are optional and may be performed by a MMU or the like. It is noted that the blocks shown in FIG. 9 are not required to perform the method 800. If the method 800 includes at least one block of FIG. 9, then the method 800 may terminate after the at least one block, without necessarily having to include any subsequent downstream blocks that may be illustrated. It is further noted that numbers of the blocks do not imply a particular order in which the blocks may be performed according to the method 400.

With continued reference to FIG. 9, the physical network may include the Internet, at least one wide area network (WAN), and/or at least one local area network (LAN). In related aspects, at least one of the virtual layered networks may include a virtual network that is tunneled through or layered over the physical network. In the alternative, or in addition, at least one of the virtual layered networks may comprise a virtual local area network (VLAN). In further related aspects, establishing the single network communications socket (NCS) may involve, at 860, establishing a virtual routing module within the MMU or a link to a virtual routing unit somewhere between a network entity and the operating system. The method 800 may further involve, at 870, allowing the virtual layered networks to communicate with other virtual layered networks of a second group via a virtual routing module.

Figure 10:
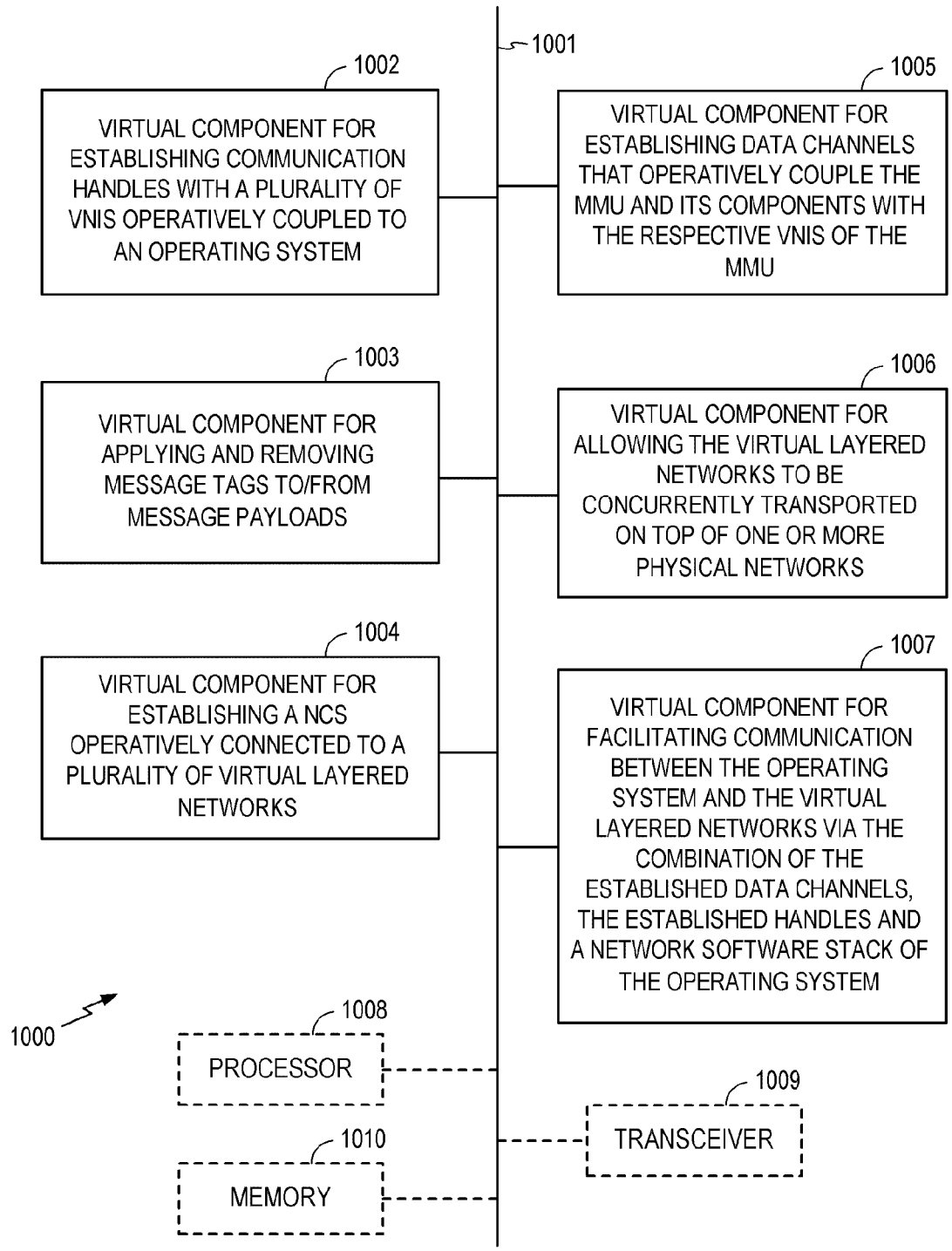
FIG. 10 shows an example virtual apparatus for establishing multiple concurrent virtual networks, in accordance with the methodology of FIGS. 4-7.

In accordance with one or more aspects of the embodiments described herein, there are provided devices and apparatuses for establishing and using multiple concurrent virtual networks, as described above with reference to FIG. 8. With reference to FIG. 10, there is provided an exemplary apparatus 1000 that may be configured as a device, or as a processor for use within the device. The apparatus 1000 may include functional blocks that can represent functions implemented by a processor, software, or combination thereof (e.g., firmware).

For example, the apparatus 1000 of FIG. 10 may comprise a virtual electrical component or module 1002 for establishing communication handles with a plurality of VNIs operatively coupled to an operating system. The apparatus 1000 may comprise a virtual component 1003 for applying and removing message tags to/from message payloads. The apparatus 1000 may comprise a virtual component 1004 for establishing a NCS operatively connected to a plurality of virtual layered networks. The apparatus 1000 may comprise a virtual component 1005 for establishing data channels that operatively couple the MMU and its components with the respective VNIs of the MMU. The apparatus 1000 may comprise a virtual component 1006 for allowing the virtual layered networks to be concurrently transported on top of one or more physical networks. The apparatus 1000 may comprise a virtual component 1007 for facilitating communication between the operating system and the virtual layered networks via the combination of the established data channels, the established handles and a network software stack of the operating system.

In related aspects, the apparatus 1000 may optionally include a processor component 1008 having at least one processor. The processor 1008, in such case, may be in operative communication with the virtual components 1002-1007 via a bus 1001 or similar communication coupling. The processor 1008 may effect initiation and scheduling of the processes or functions performed by virtual components 1002-1007.

In further related aspects, the apparatus 1000 may include a transceiver component 1009. A stand alone receiver and/or stand alone transmitter may be used in lieu of or in conjunction with the transceiver 1009. The apparatus 1000 may optionally include a component for storing information, such as, for example, a memory device/component 1010. The computer-readable medium or the memory component 1010 may be operatively coupled to the virtual components of the apparatus 1000 via a bus 1001 or the like. The memory component 1010 may be adapted to store computer-readable instructions and data for effecting the processes and behavior of the virtual components 1002-1007. While shown as being external to the processor 1008, the transceiver 1009, and the memory 1010, it is to be understood that one or more of the virtual components 1002-1007 can exist within the processor 1008, the transceiver 1009, and/or the memory 1010.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the disclosure herein may be implemented as electronic hardware, computer software, or combination of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the processor and the storage medium may reside in an ASIC.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose processor. Also, any connection is properly termed a computer-readable medium. For example, if the software is transmitted from a website, server, or other remote source using a coaxial cable, fiber optic cable, twisted pair, DSL, or the non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable medium.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A software-implemented method operable by a network system comprising a processor and a memory storing instructions which, when executed by the processor, cause the processor to implement a message management unit (MMU), the MMU performing the method comprising:
    establishing communication handles with a plurality of virtual network interfaces (VNIs) operatively coupled to an operating system;
    establishing a network communications socket (NCS) operatively connected to a plurality of virtual layered networks;
    establishing data channels that operatively couple the MMU and its components with the respective VNIs of the MMU;
    allowing the virtual layered networks to be concurrently transported on top of one or more physical networks; and
    facilitating communication between the operating system and the virtual layered networks via the combination of the established data channels, the established handles and a network software stack of the operating system.

2. The method of claim 1, wherein at least one of the virtual layered networks comprises a virtual network (VN) that is tunneled through or layered over the physical network.

3. The method of claim 1, wherein at least one of the virtual layered networks represents a virtual local area network (VLAN).

4. The method of claim 1, wherein at least one of the VLANs further comprises a layered encryption zone (LENZ).

5. The method of claim 1, further comprising establishing a virtual routing module within the MMU or a link to a virtual routing unit between a network entity and the operating system.

6. The method of claim 1, further comprising allowing the virtual layered networks to communicate with other virtual layered networks of a second group via a virtual routing module of the MMU.

7. The method of claim 1, wherein the physical network comprises at least one wide area network (WAN).

8. The method of claim 1, wherein the physical network comprises at least one local area network (LAN).

9. A system of multiple concurrent virtual networks, comprising:
    a plurality of virtual layered networks operatively coupled to a network communications socket (NCS);
    a processor;
    a memory storing instructions which, when executed by the processor, cause the processor to implement a message management unit (MMU) in operative communication with the NCS and at least one virtual network interface (VNI);
    an operating system operatively coupled to the at least one VNI; and
    a virtual routing module within at least one of the MMU or a virtual routing unit adjacent to and linked to the MMU;
    wherein the the memory is further configured to store instructions which, when executed by the processor cause the processor to implement the MMU via:
        allowing the virtual layered networks to be concurrently transported on top of one or more physical networks; and
        facilitating communication between the operating system and the virtual layered networks concurrently via the NCS.

10. The system of claim 9, wherein at least one of the virtual layered networks comprises a virtual network (VN) that is tunneled through or layered over the physical network.

11. The system of claim 9, wherein at least one of the virtual layered networks represents a virtual local area network (VLAN).

12. The system of claim 9, wherein at least one of the VLANs further comprises a layered encryption zone (LENZ).

13. The system of claim 9, wherein the MMU comprises a message payload encapsulation module (MPEM), wherein the MPEM is configured to read a message payload from a virtual network interface, tag the payload with virtual layered network identification data, and return the resulting message to the MMU for writing to the network communications socket.

14. The system of claim 9, wherein the MMU comprises a message payload encapsulation module (MPEM), wherein the MPEM is configured to read a message from the NCS, nseparate a tag from the message, and return the resulting payload and tag structure to the MMU for inspection and writing the payload to a VNI.

15. The system of claim 9, wherein the at least one VNI is configured as a wildcard Node.

16. The system of claim 9, wherein:
the virtual layered networks belong to a first group; and
the virtual routing module is configured to allow the virtual layered networks to communicate with other virtual layered networks of a second group.

17. The system of claim 9, wherein the system is implemented as a software process.

18. The system of claim 9, wherein the physical network comprises at least one wide area network (WAN).

19. The system of claim 9, wherein the physical network comprises at least one local area network (LAN).

20. A computer program product, comprising:
a non-transitory computer-readable medium comprising code for causing a computer to:
- establish communication handles with a plurality of virtual network interfaces (VNIs) operatively coupled to an operating system;
- establish a network communications socket (NCS) operatively connected to a plurality of virtual layered networks;
- establish data channels that operatively couple a message management unit (MMU) and its components with the respective VNIs of the MMU;
- allow the virtual layered networks to be concurrently transported on top of one or more physical networks; and
- facilitate communication between the operating system and the virtual layered networks via the combination of the established data channels, the established handles and a network software stack of the operating system.

\* \* \* \* \*